United States Patent
Shibuya

[19]

[11] Patent Number: 6,081,886
[45] Date of Patent: *Jun. 27, 2000

[54] HOLDING MECHANISM FOR CHANGING OPERATION MODES IN A PIPELINED COMPUTER

[75] Inventor: Toshiteru Shibuya, Yamanashi, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/049,058

[22] Filed: Mar. 27, 1998

[30] Foreign Application Priority Data

Apr. 3, 1997 [JP] Japan .................................... 9-084867

[51] Int. Cl.$^7$ .................................................. G06F 9/38
[52] U.S. Cl. ............................................................ 712/229
[58] Field of Search ............................... 712/215, 32, 43, 712/200, 205, 208, 229

[56] References Cited

U.S. PATENT DOCUMENTS

| | | | |
|---|---|---|---|
| 4,967,338 | 10/1990 | Kiyohara et al. | 712/32 |
| 5,097,407 | 3/1992 | Hino et al. | 712/209 |
| 5,261,063 | 11/1993 | Kohn et al. | 712/229 |
| 5,710,912 | 1/1998 | Schlansker et al. | 712/220 |
| 5,809,320 | 9/1998 | Jain et al. | 712/34 |
| 5,884,060 | 3/1999 | Vegesna et al. | 712/215 |
| 5,898,852 | 4/1999 | Petollino et al. | 712/214 |

FOREIGN PATENT DOCUMENTS 1-291327  11/1989  Japan .

*Primary Examiner*—David Y. Eng
*Attorney, Agent, or Firm*—McGinn & Gibb, P.C.

[57] ABSTRACT

A pipelined computer comprises a plurality of stages. An instruction subsequent to an operation mode changing instruction is held in a predetermined stage according to a type of the operation mode changing instruction. For example, if the instruction is the one subsequent to an ICP (Instruction mode Change to Privilege) instruction, it is held in an instruction decode stage where a privilege exception is detected. If the instruction is the one subsequent to an ACS (Addressing mode Change to Secure) instruction, it is held in an address adding stage where an address computation is performed. Moreover, if the instruction is the one subsequent to an ACD (Addressing mode Change to Direct) instruction, they are held in an address translation stage where an address translation is performed. These holdings are released after the operation mode changing instruction is completed. Furthermore, if the subsequent instructions are the ones which are not affected by the operation mode changing instruction, the subsequent instruction may be controlled so as not to be held.

19 Claims, 10 Drawing Sheets

HOLDING MECHANISM FOR CHANGING OPERATION MODES IN A PIPELINED COMPUTER

BACKGROUND OF THE INVENTION

The present invention relates to a holding mechanism for changing operation modes in a pipelined computer, and more particularly to a holding mechanism for shortening an execution time of an instruction for changing operation modes (a mode changing instruction).

More specifically, the mode changing instruction changes an address mode, for example, between a real address mode and a virtual address mode. The mode changing instruction changes modes of an address computation or alternately changes them between a privilege mode that can execute all kinds of instructions and a general mode that can execute instructions other than the privilege instructions.

In the conventional pipelined computer, an execution result of the mode changing instruction has an effect almost on the whole of the pipeline computer, so that an instruction next to the mode changing instruction can not be executed in each stage of the pipeline immediately after the mode changing instruction. This originates in that the execution contents of the instructions subsequent to the preceding instruction are changed by the result of that instruction issued immediately before. The situations, that prevent the next instruction in the instruction stream from executing during its designated clock cycle, are called pipeline hazards. Particularly, the pipeline hazards caused by the mode changing instruction or the branching instruction are called the control hazards.

The pipelined computer is configured such that starting for the succeeding instruction is performed again after completion of the instruction that caused the control hazards when the control hazards occur, as is recited in ÆComputer ArchitectureÅ Chapter 6.4, FIG. 6.16, by Hennessy and Patterson.

The above described conventional pipelined computer has posed the problem in its performance that the pipeline execution can not be applied to the instructions succeeding to the mode changing instruction. Specifically, depending on the mode changed by the mode changing instruction it is changed whether the contents of the succeeding processing are changed or not. Moreover, since it is vague which stage of the pipeline the execution result for the mode changing instruction has an affect on, it can not help to take conservative countermeasures in order to perform processing for the succeeding instructions with safety.

SUMMARY OF THE INVENTION

In view of the foregoing problem of the conventional system, an object of the present invention is to provide a pipelined computer which is capable of solving such problems and performing an execution of a mode changing instruction at a high speed.

In a pipelined computer according to a first aspect of the present invention, the pipelined computer has a plurality of stages. The pipelined computer switches an operation depending on an operation mode. According to a type of a mode changing instruction for instructing a change of said operation mode, an instruction subsequent to said mode changing instruction is held in a stage where operation of said each instruction is affected.

BRIEF DESCRIPTION OF THE DRAWINGS

The above-mentioned and other objects, features and advantages of this invention will become more apparent by reference to the following detailed description of the invention taken in conjunction with the accompanying drawings in which.

DETAILED DESCRIPTION OF THE PREFERRED EMBODIMENTS

A pipelined computer in accordance with preferred embodiments of the present invention will be described in detail with reference to the accompanying drawings.

Figure 1:
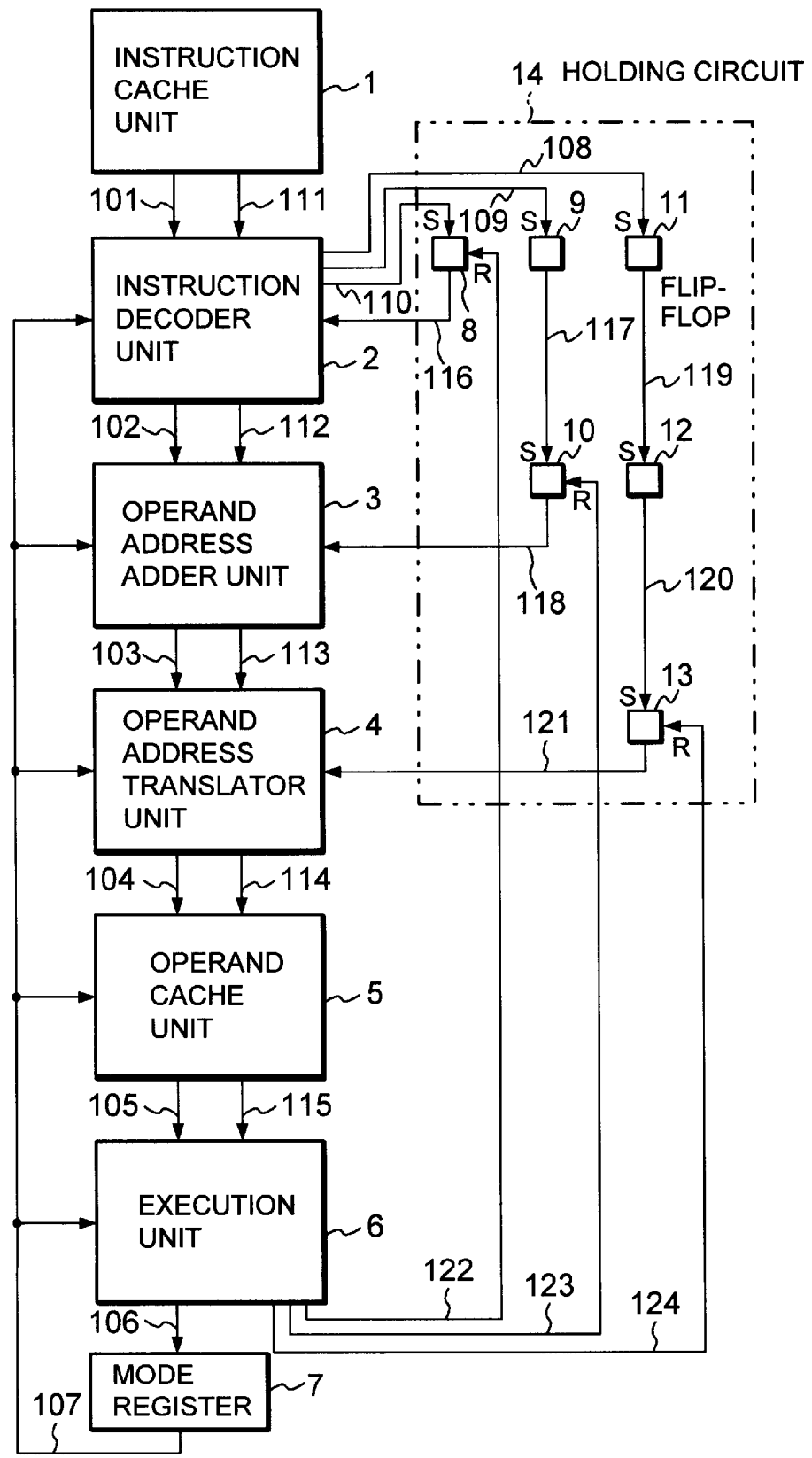
FIG. 1 is a block diagram showing the configuration of a pipelined computer according to an embodiment of the present invention.

Referring to FIG. 1, the pipelined computer of a first embodiment of the present invention comprises an instruction cache (IC) unit 1 for storing instructions; an instruction decoder (ID) unit 2 for decoding the instructions; an addressing adder (OA) unit 3 for computing an operand address; an operation address translator (OT) unit 4 for converting the operand address from a virtual address to a real address; an operand cache (OC) unit 5 for storing a memory operand; an execution (EX) unit 6 for executing the instructions; a mode register 7 for holding a mode; and a holding circuit 14 having flip-flops 8 to 13.

The IC unit 1 and the OC unit 5 may be a main memory. Alternately, they may be configured as an instruction cache memory and an operand cache memory. Furthermore, the IC unit 1 and the OC unit 5 may be configured as a single unit that is shared by them.

The units 1 to 6 in FIG. 1 constitutes each of the stages for corresponding pipelines. Consequently, the pipelined computer of the embodiment has the pipelines composed of the six stages. The flip-flops 8, 10 and 13 are set through the corresponding signal lines 110, 117 and 120, for example, "1" and reset through the corresponding signal lines 122, 123 and 124, for example, "0". The flip-flops 9 and 11 are set through the signal lines 108 and 109, respectively, when the instructions corresponding to the ID stages are present. Upon moving of these instructions to their next stages, their contents are transmitted to the flip-flops 10 and 12, respectively. When the instruction of the ID stage is transmitted to the OA stage, the flip-flop 12 is set through the signal line 119. Upon transmitting of this instruction to the next stage, its content is transmitted to the flip-flop 13.

After the execution of the mode changing instruction, the EX unit 6 sets the changed mode to the mode register 7 through the signal line 106. The EX unit 6 asserts the signal line 122 in the case where the mode changing instruction is either an ICP instruction or an ICG instruction which are later described. In the case where the mode changing instruction is either an ACS instruction or an ACL instruction, the EX unit 6 asserts the signal line 123. In the case where the mode changing instruction is either an ACD instruction or an ACM instruction, the EX unit 6 asserts the signal line 124.

Figure 2:
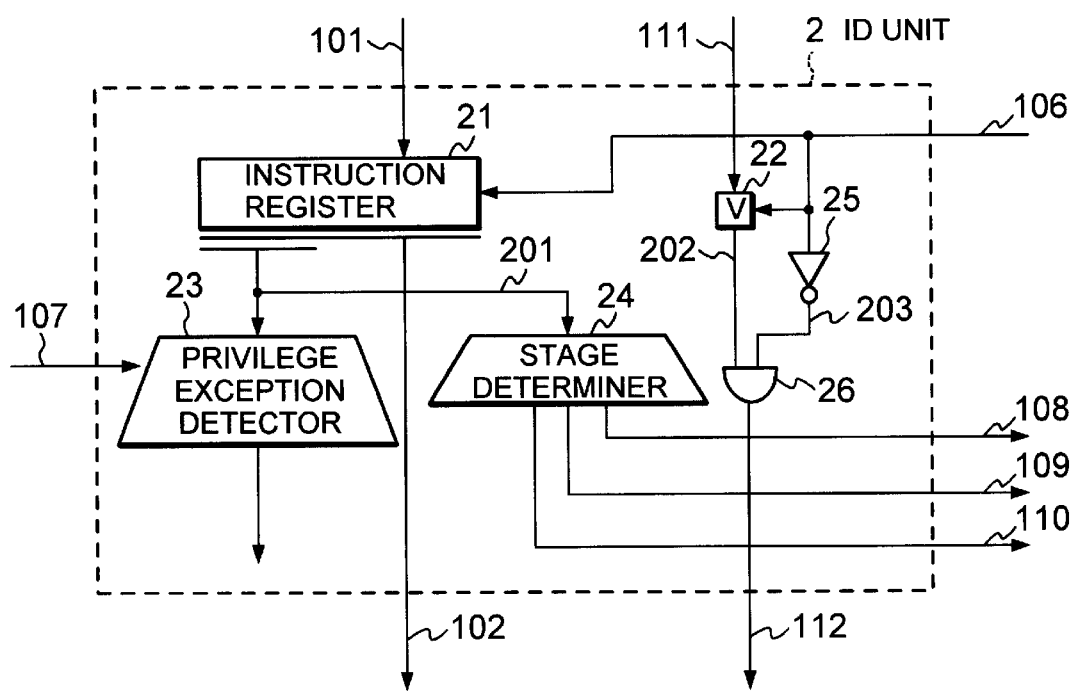
FIG. 2 is a block diagram showing the configuration of an ID unit 2 of a first embodiment according to the present invention.

Referring to FIG. 2, the ID unit 2 comprises an instruction register 21 for holding an instruction word read out by the IC unit 1; a Valid (V) flip-flop 22 for indicating the validity of the content of the instruction register 21; a privileged exception detector 23 for detecting the privileged exception when the instruction held in the instruction register 21 is the privileged instruction; a stage determiner 24 for decoding the mode changing instruction to decide the stage where an operation is changed depending on the mode changed by this mode changing instruction; an inverter 25; and an AND gate 26.

The privileged exception detector 23 and the stage determiner 24 may be constituted as a single instruction decoder shared by them. The ID unit 2 receives the instruction word through the signal line 101, which is read out by the IC unit 1. Similarly, the Valid (V) signal given from the IC unit 1 through the signal line 111 indicates the validity of the signal line 101. The instruction register 21 holds data of the signal line 101 when the signal line 111 indicates the A validity≅(for example, "1"). The V signal of the signal line 111 is held in the V flip-flop 22 as it is, indicating that the instruction register 21 is valid.

The signal line 102 which extends from the ID unit 2 to the OA unit 3 transmits the instruction information output from the ID unit 2. The signal line 112 transmits the V signal indicating the validity of the signal line 102. The instruction register 21 and the V flip-flop 22 continue to hold the contents of the signal lines 101 and 111 regardless of the states of the lines 101 and 111, when the holding instruction of the signal line 116 shows the "hold", for example, "1". Moreover, when the holding instruction of the signal line 116 shows the "hold", i.e., "1", the V signal of the "invalidity", i.e., "0" is output to the signal line 112 as the V signal by the inverter 25 and the AND gate 26 unconditionally, regardless of the content of the V flip-flop 22. On the other hand, when the hold instruction thereof shows "non-hold", i.e., "0", the content of the V flip-flop 22 is outputted to the signal line 112 as the V signal.

The mode changing instruction decoded by the instruction decoder 2 includes the following six kinds of the instructions, for example.

ICP (Instruction mode Change to Privilege) instruction:
　Changing to mode capable of executing also the privilege instruction.
ICG (Instruction mode Change to General) instruction:
　Changing to general mode incapable of executing the privilege instruction.
ACS (Addressing mode Change to Secure) instruction:
　Changing to the mode allowing occurrences of no carry or no borrow during computing the operand address.
ACL (Addressing mode Change to Loose) instruction:
　Changing to the mode allowing occurrences of a carry or a borrow during computing the operand address.
ACD (Addressing mode Change to Direct) instruction:
　Changing to the mode dealing the operand address computation result as a real address.
ACM (Addressing mode Change to Mapping) instruction:
　Changing to the mode dealing the operand address computation result as a virtual address.

In the case where the instruction word held in the instruction register 21 is either the ICP instruction or the ICG instruction, the signal line 110 is asserted (for example, "1"). In the case where it is either the ACS instruction or the ACL instruction, the signal line 109 is asserted (for example, "1"). In the case where it is either the ACD instruction or the ACM instruction, the signal line 108 is asserted (for example, "1").

In the privilege mode, the privilege exception detector 23 decodes all of the instructions including the privilege instruction according to the operation mode given through the signal line 107. In the general mode, the privilege exception detector 23 reports the detection of the privilege instruction exception in the case where the detector 23 decodes the privilege instruction.

Figure 3:
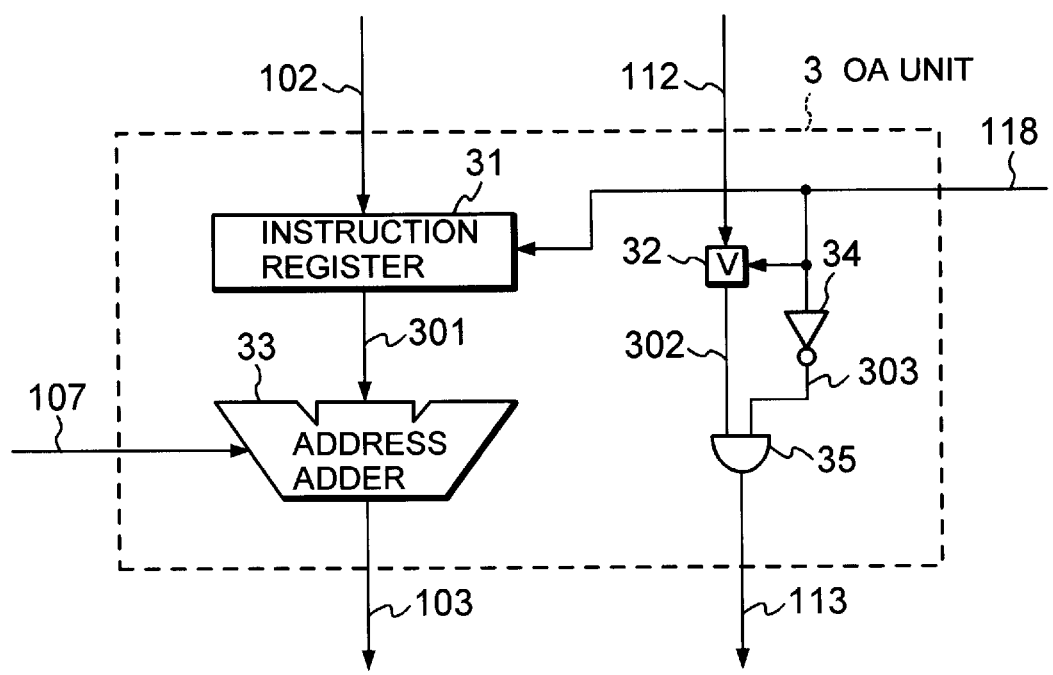
FIG. 3 is a block diagram showing the configuration of an OA (Operand address Adder) unit 3 of the present invention.

Referring to FIG. 3, the OA unit 3 comprises a register 31 for holding instruction information given through the signal line 102; an address adder 33 for computing the operand address to output the computation result to the signal line 103; a V flip-flop 32 for indicating the validity of the register 31; an inverter 34; and an AND gate 35.

The signal line 112 is a V signal from the ID unit 2. The "validity" (for example, "1") is given to the flip-flop 32, it indicates the "validity", too. At the same time, the register 31 holds the content of the signal line 102. When the signal line 118 indicates the "hold" (for example, "1"), the register 31 and the V flip-flop 32 continue to hold their contents, regardless of the states of the signal line 102 and 112. Moreover, when the signal line 118 indicates the "hold" (i.e., "1"), the signal indicating the "invalidity" (i.e., "0") is output to the signal line 113 as the V signal. On the other hand, when the signal line 118 indicates the "non-hold" (i.e., "0"), the content of the V flip-flop 32 is output as the V signal.

In the "operand address computation protection mode", when the carry or the borrow occurs during the computation, the address adder 33 detects it as the address computation exception according to the computation mode given through the signal line 107. In the "non-protection mode", the adder 33 detects no address computation exception.

Figure 4:
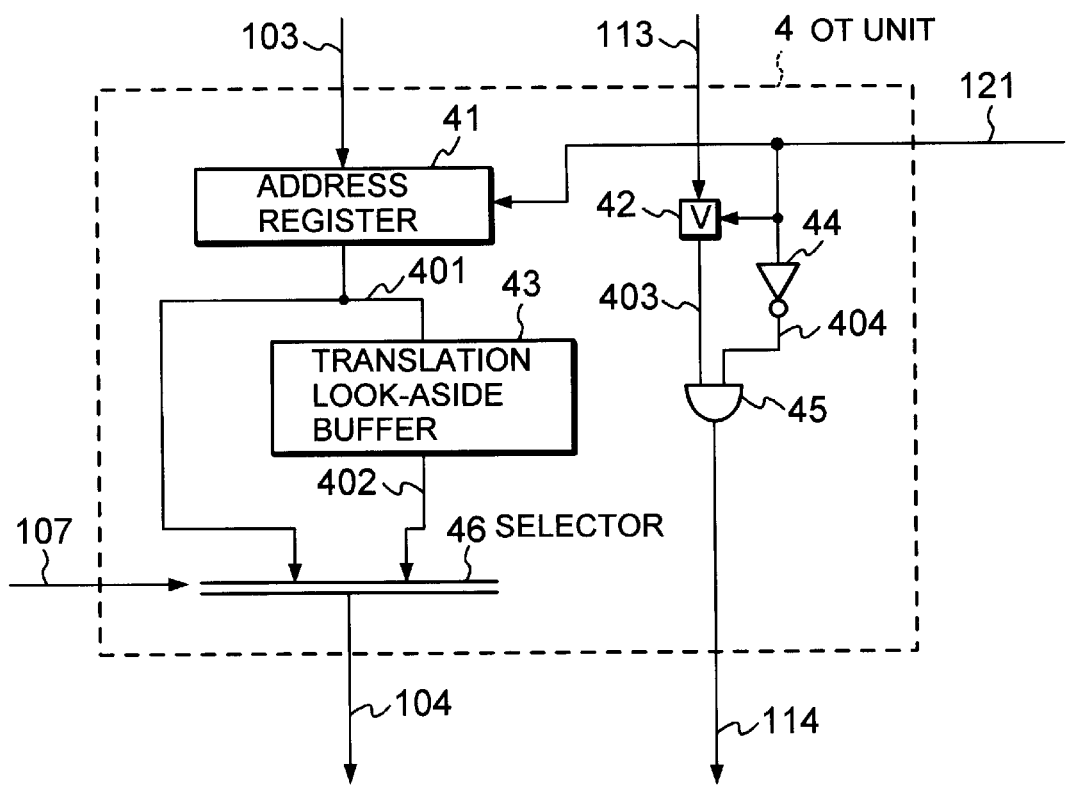
FIG. 4 is a block diagram showing a structure of an OT (Operand address Translation) unit 4 of the present invention.

Referring to FIG. 4, the OT unit 4 comprises an address register 41 for holding an operand address computation result given through the signal line 103; a V flip-flop 42 for indicating a validity of the address register 41; a translation look-aside buffer 43 for converting a virtual address held by the address register 41 to a real address; a selector 46 for selecting one of the address register 1 and the translation look-aside buffer 43 to output an output from the selected one to the signal line 104; an inverter 44; and an AND gate 45.

When the V signal of the signal line 113 from the OA unit indicates the "validity" (e.g., "1"), the V flip-flop 42 holds the "validity" (e.g., "1"). At the same time, the address register 41 holds the operand address by the signal line 103. The address register 41 and the V flip-flop 42 continue to hold their contents of the signal lines 103 and 113, regardless of the states of the signal lines 103 and 113, when the hold instruction of the signal line 121 indicates the "hold" (e.g., "1"). Moreover, when the signal line 121 indicates the "hold" (i.e., "1"), the "invalidity" (i.e., "0")is output as the V signal to the signal line 114 regardless of the content of the V flip-flop 42. On the other hand, when the hold instruction indicates "non-hold" (i.e., "0"), the content of the V flip-flop 42 is output to the signal line 114 as the V signal.

When the address mode signal given through the signal line 107 indicates the memory operand real address mode, the selector 46 outputs the content of the address register 41 to the signal line 124 as it is. On the other hand, when the address mode signal indicates the memory operand virtual address mode, the output of the translation look-aside buffer 43 is outputted to the signal line 104.

Next, an operation of the foregoing first embodiment according to the present invention will be described with reference to the drawings in detail.

When a hold occurs on subsequent stages in the pipeline, it is well known that the stages disposed at the previous positions of the subsequent stages are naturally held so that the operations of them are omitted for the simplicity of descriptions.

Figure 5:
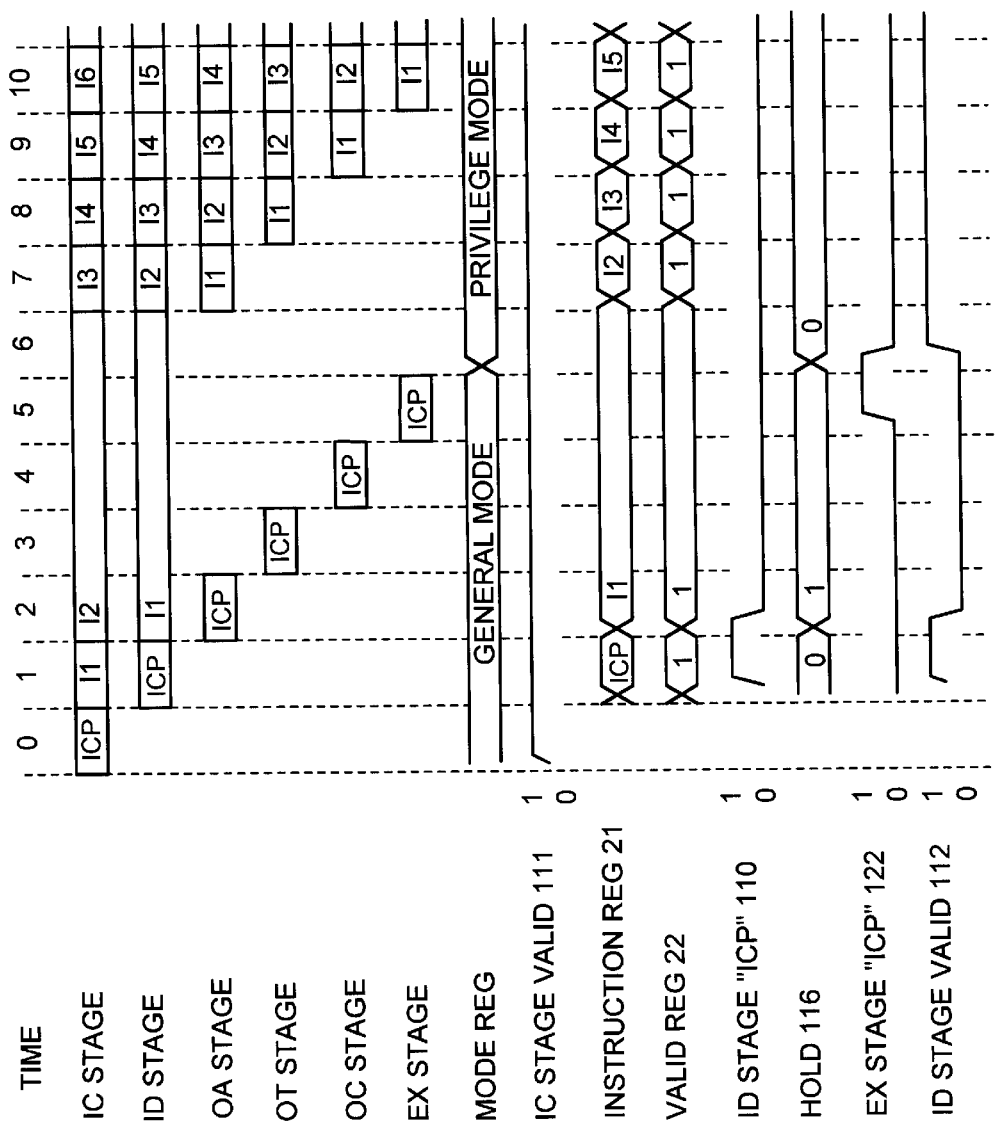
FIG. 5 is a timing chart showing an operation during an ICP (Instruction mode Change to Privilege) instruction execution of the present invention.

Referring to FIGS. 1, 2 and 5, an operation concerning the ICP (Instruction mode Change to Privilege) instruction will be described.

Referring to FIG. 5, when the ICP instruction is read out at time 0, an operation at the ID stage starts at time 1. At this time, the instruction I1 subsequent to the ICP instruction is on the IC stage. Under such circumstances, the mode register 7 is in the general mode.

At time 1, the instruction ICP is set in the instruction register 21. At the same time, the V flip-flop 22 is also set to the "validity" (i.e., "1"). The instruction decoder 24 decides that the instruction set in the instruction register is the ICP instruction and asserts the signal line 110 (i.e., "1"). Since the flip-flop 8 indicates the "invalidity" (i.e., "0") and the signal line 116 indicates the "non-holding" (i.e., "0"), the output of the V flip-flop 22 appears as it is as the V signal of the signal line 112 and the "validity" (i.e., "1") is indicated.

At time 2, upon receipt of the value of the signal line 112, the ICP instruction advances to the OA stage, and the subsequent instruction I1 to the ID stage. Then, the instruction I1 is set in the instruction register 21 and the "validity" (i.e., "1") is set in the V flip-flop 22. At the same time, upon receipt of the value of the signal line 110, the "hold" (i.e., "1") is set in the flip-flop 8 so that the holding instruction of the signal line 116 becomes the "hold" (i.e., "1"). Therefore, the V signal of the signal line 112 becomes the "invalid" (i.e., "0") by the inverter 25 and the AND gate 26.

At time 3, the ICP instruction advances to the OT stage. Since the V signal of the signal line 112 is at the state of the "invalidity" (i.e., "0"), the subsequent instruction I1 does not advance to the OA stage. Since the signal line 116 indicates the "hold" (i.e., "1"), the instruction register 21 and the V flip-flop 22 continue to hold their contents. As a result, the instruction I1 remains in the ID stage.

In times 4 and 5 after those times, the instruction I1 remains in the ID stage. When the ICP instruction reaches the EX stage at time 5, the EX unit 6 executes the ICP instruction, and instructs the set of the privilege mode to the mode register 7 in the signal line 106. At the same time, an instruction to be processed in the EX stage is the ICP instruction so that the signal line 122 is asserted (i.e., "1").

At time 6, the mode register 7 receives the signal line 106, and is updated so as to indicate the privilege mode, thereby completing the execution for the ICP instruction. At the same time, the flip-flop 8 receives the signal line 122, whereby the flip-flop 8 is reset to the state where the "holding" is not performed ( "0"). As a result, the holding instruction of the signal line 116 becomes "0", and the holding instructions of the instruction register 21 and V flip-flop 22 are released so that the V signal of the signal line 112 becomes "validity" ( "1"). The privilege exception detector 23 decodes the instruction I1 of the IR 21 according to the privilege mode given through the signal line 107.

At time 7, the instruction I1 which is released from its state where it is being held advances from the ID stage to the OA stage. Thereafter, the subsequent instructions are subjected to the pipeline processing in sequence. In this case, an empty time equal to the four machine cycles are present from completion of the execution of the ICP instruction to completion of the execution of the subsequent instruction I1. This implies that the five machine cycles are required to execute the instruction ICP.

Figure 10:
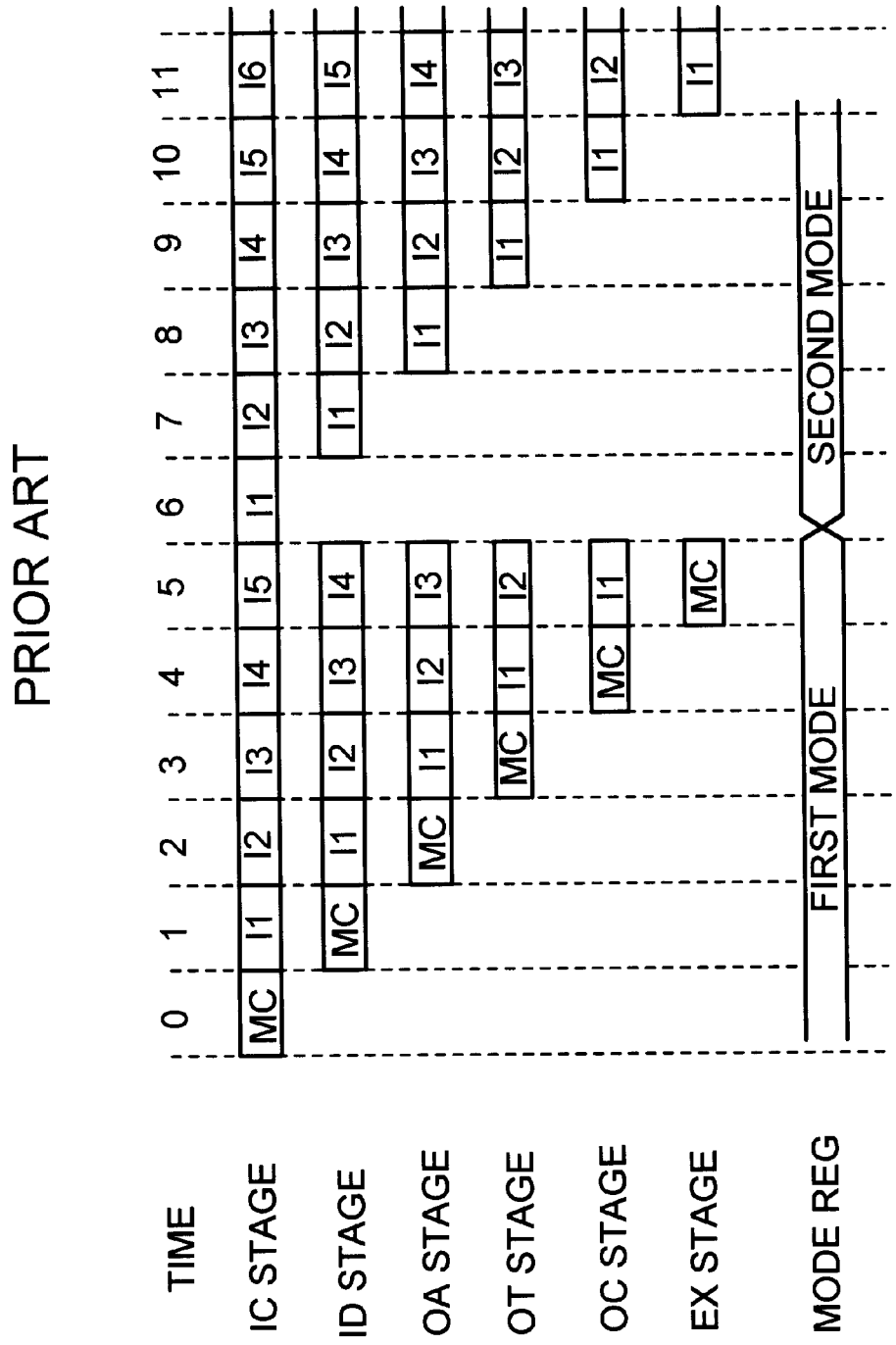
FIG. 10 is a timing chart showing an operation of a conventional pipelined computer.

Referring to FIG. 10, in the prior art to which the present invention is not applied, since the subsequent instruction I1 is started after completion of the mode changing instruction MC, six machine cycles are taken in order to execute the instruction MC. It is understood that the time to execute the instruction MC is shortened by one machine cycle by the present invention. An operation for the ICG instruction is performed according to the equivalent timing to that of the ICP instruction.

Next, referring to FIGS. 1 to 3 and 6, an ACS (Addressing mode Change to Secure) instruction operation will be described.

Figure 6:
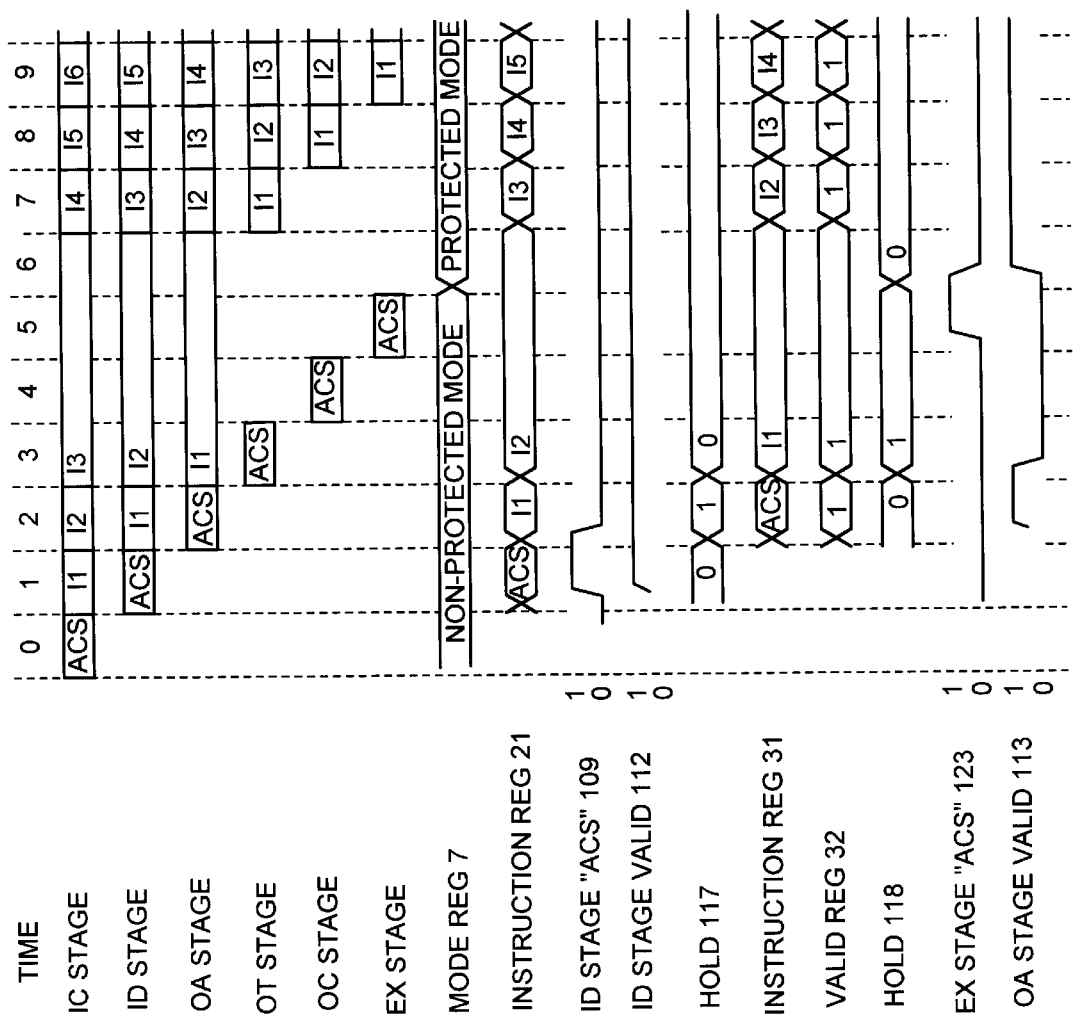
FIG. 6 is a timing chart showing an operation during an ACS (Addressing mode Change to Secure) instruction execution of the present invention.

Referring to FIG. 6, the ACS instruction is read out at time 0. At time 1, it is set in the instruction register 21 of the ID stage. As a result, the instruction decoder 24 decides that the instruction set in the instruction register 21 is the ACS instruction, and outputs "1" to the signal line 109. At this time, the V signal of the signal line 112 in the ID stage is at "1".

At time 2, the ACS instruction advances to the OA stage and "1" is set in the V flip-flop 32 in the OA stage. The subsequent instruction I1 advances to the ID stage and the instruction I1 is set in the instruction register 21. Since the instruction I1 is not the mode changing instruction, the instruction decoder 24 outputs "0" to the signal line 109. Upon receipt of the value of the signal line 109, the flip-flop 9 is set to "1". Since the flip-flop 10 is "0" and the holding instruction of the signal line 118 is "0", the V signal of the signal line 113 in the OA stage outputs the value "1" of the V flip-flop 32 as it is.

At time 3, upon receipt of the value of the signal line 113, the ACS instruction advances to the OT stage, and the subsequent instruction I1 advances to the OA stage. The V flip-flop 32 in the OA stage is set to "1". The flip-flop 10 receives the value of the signal line 109, whereby "0" is set therein. Sine the flip-flop 10 is being set to "1", the holding instruction of the signal line 118 becomes "1". Thus, "0" is output to the signal line 113 and the V signal in the OA stage by the inverter 34 and the AND gate 35.

At time 4, although the instruction ACS advances to the OC stage, the subsequent instruction I1 does not advance to the OT stage because the V signal of the signal line 113 is "0" at time 3. The register 31 and the V flip-flop 32 continue to hold their contents because the holding instruction of the signal line 118 is "1". As a result, the instruction I1 remains in the OA stage.

At time 5, though the ACS instruction advances to the EX stage, the instruction I1 remains in the OA stage. The EX units 6 executes the ACS instruction to instruct the signal line 106 to set the operand address computation protection mode to the mode register 7. At the same time, since the EX unit processes the ACS instruction in the EX stage, the EX unit outputs "1" to the signal line 123.

At time 6, the mode register 7 receives the signal from the signal line 106 and is updated so as to indicate the operand address computation protection mode. Thus, the execution of the ACS instruction is completed. At the same time, the flip-flop 10 receives "1" of the signal line 123 at time 5 to be reset to "0". The holding instruction of the signal line 118 becomes "0", so that the holding instructions of the register 31 and the V flip-flop 32 are released and the V signal of the signal line 113 becomes "1". The adder 33 of the OA unit 3 is given the signal through the signal line 107. The adder 33 performs the computation for the operand address of the instruction I1 according to the operand address computation protection mode and outputs the computation result to the signal line 103.

At time 7, the instruction I1 which is released from its holding state advances from the OA stage to the OT stage and the subsequent instructions are processed sequentially. In this case, since the four machine cycles are necessary to execute the ACS instruction, the processing time is reduced by a quantity equal to the two machine cycles, compared to the six machine cycles in the timing chart of FIG. 10 to which the present invention is not applied. It should be noted that the operation for the ACL instruction is equal to that for the ACS operation from the viewpoint of timing.

Next, referring to FIGS. 1, 2 and 7, an operation of this embodiment for executing the ACM (Addressing mode Change to Mapping) instruction will be described.

Figure 7:
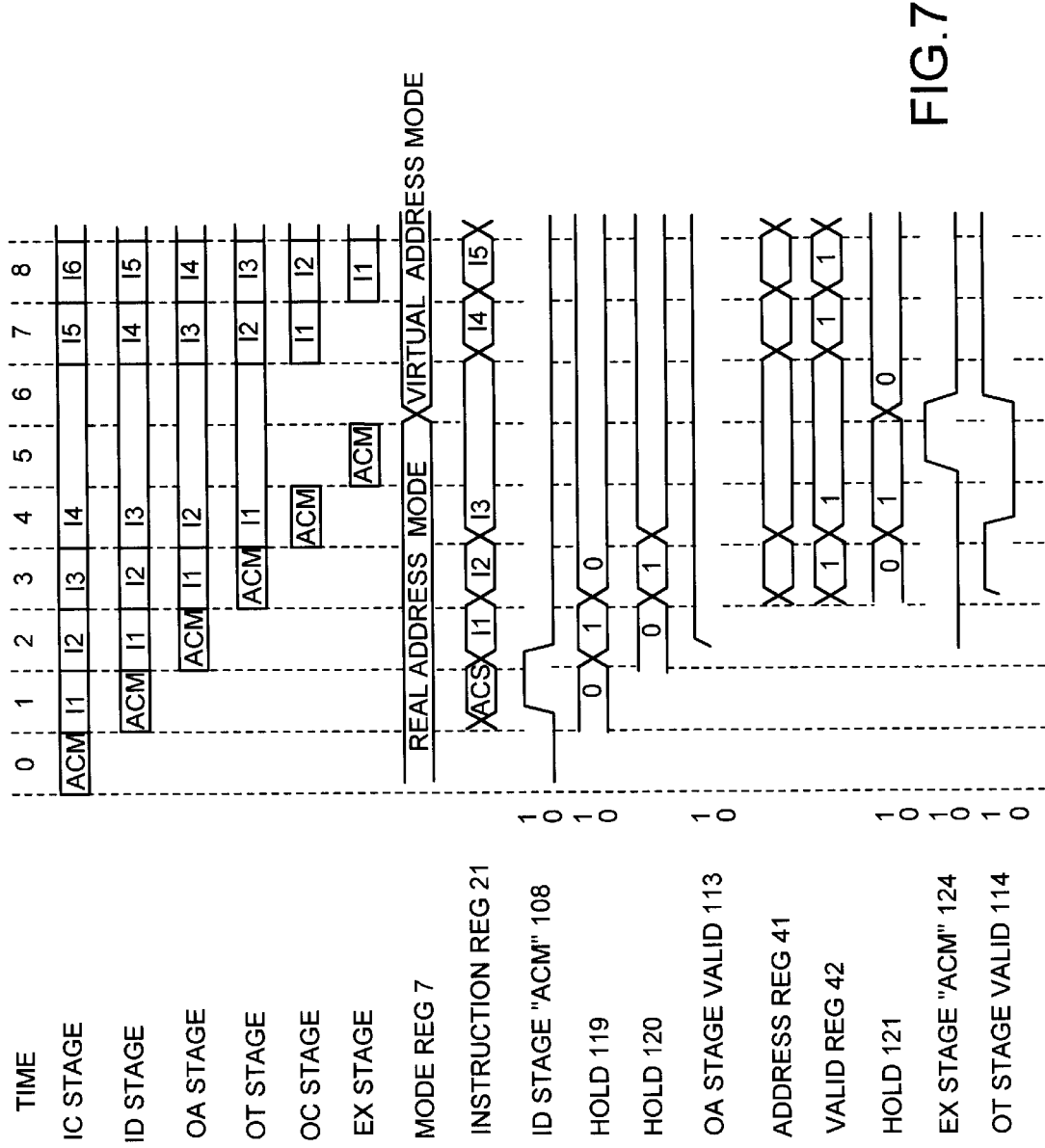
FIG. 7 is a timing chart showing an operation during an ACM (Addressing mode Change to Mapping) instruction execution of the present invention.

Referring to FIG. 7, the ACM instruction is read out at time 0, and set in the instruction register 1 in the ID stage at time 1. The instruction decoder 24 decides that instruction set in the instruction register 21 is the ACM instruction, and outputs "1" to the signal line 108.

At time 2, the ACM instruction advances to the OA stage. The flip-flop 11 receives the signal from the signal line 108 at time 1 to be set to "1". The instruction I1 subsequent to the ACM instruction is in the ID stage, and the instruction decoder 24 outputs "0" to the signal line 108 according to the instruction I1 of the instruction register 21.

At time 3, the ACM instruction advances to the OT stage and the instruction I1 advances to the OA stage. The flip-flop 11 receives the signal from the signal line 108 at time 2 to be set to "0" and the flip-flop 12 receives the signal from the flip-flop 11 to be set to "1".

At time 4, the ACM instruction advances to the OC stage and the instruction I1 advances to the OT stage. The operand address of the instruction I1 computed in the OA stage at time 3 is set in the address register 41. The V flip-flop 42 in the OT stage is set to "1". "1" is set to the flip-flop 13 by the flip-flop 12 at time 3 so that the holding instruction of the signal line 121 becomes "1". For this reason, "0" is output to the signal line 114 for the V signal in the OT stage by the inverter 44 and the AND gate 45.

At time 5, the ACM instruction advances to the EX stage. Since the V signal of the signal line 114 is "0" at time 4, the instruction I1 does not advance to the OC stage. The holding instruction of the signal line 121 is being kept at "1" so that the address register 41 and the V flip-flop 42 hold their contents. As a result, the instruction I1 remains in the OT stage. The EX unit 6 executes the ACM instruction to instruct the signal line 106 to set the memory operand virtual address mode to the mode register 7. At the same time, the EX unit 6 outputs "1" to the signal line 124 because the instruction processed in the EX stage is the ACM instruction.

At time 6, the mode register 7 is updated so as to indicate the memory operand virtual address mode, thereby completing the execution of the ACM instruction. At the same time, the flip-flop 13 receives the signal of the signal lines 124 at time 5 to be reset to "0". The holding instruction of the signal line 121 becomes "0" and the holds of the address register 41 and the V flip-flop 42 are released so that the V signal of the signal line 114 becomes "1". The selector 46 of the OT unit 4 is switched so as to output the output of the translation look-aside buffer 43 to the signal line 104 according to the memory operand virtual address mode given through the signal line 107.

At time 7, the instruction I1 released from being held advances from the OT stage to the OC stage, and thereafter the subsequent instructions are processed sequentially. In this case, for executing the ACM instruction, it takes a period of time equivalent to three machine cycles, the processing time is reduced by three machine cycles compared to the case (FIG. 10) where the present invention is not applied.

It should be noted that an operation for executing the ACD instruction is equivalent to that for executing the ACM instruction from view point of the timing.

Next, a second embodiment of the present invention will be described with reference to the accompanying drawings.

Figure 8:
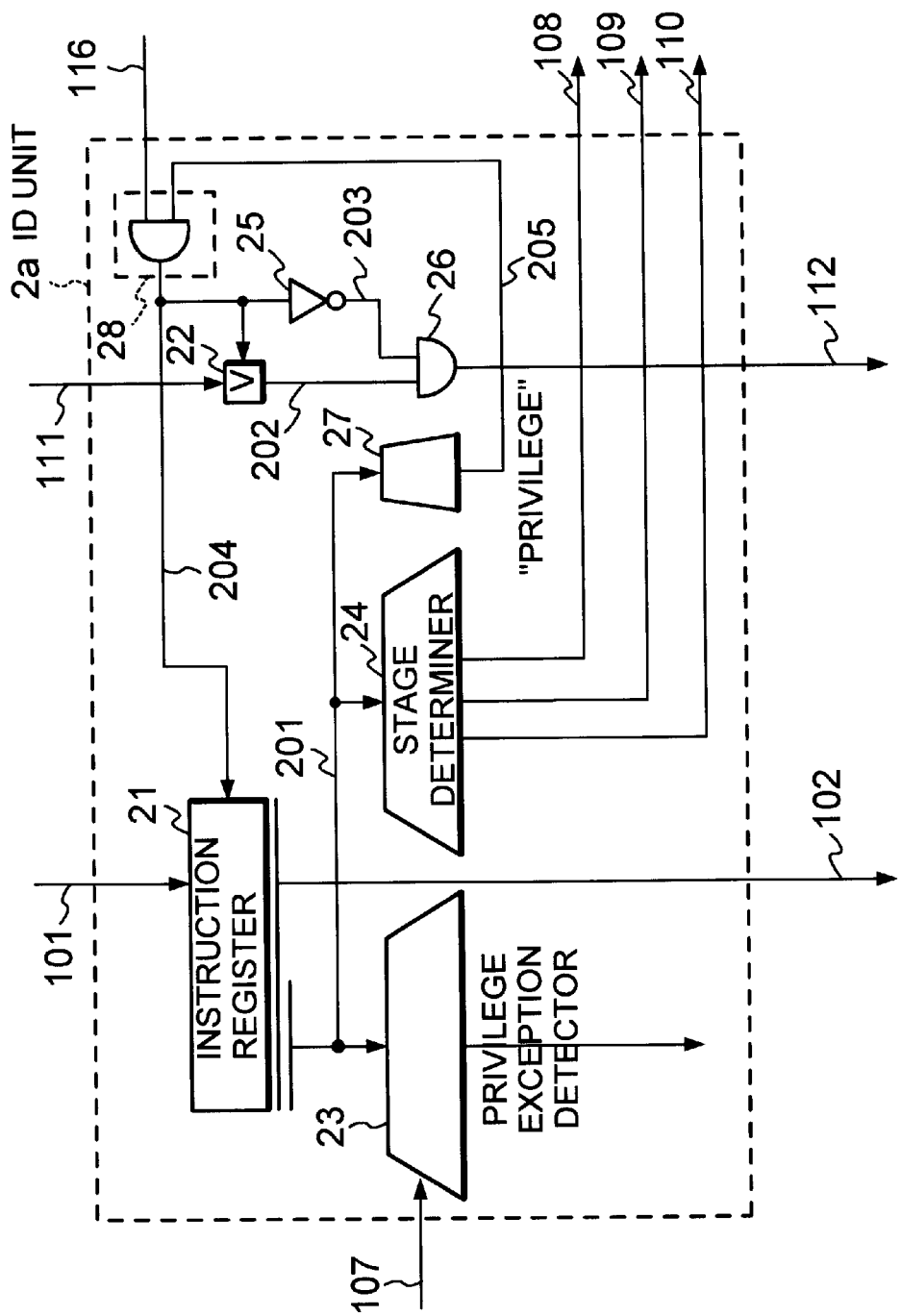
FIG. 8 is a block diagram showing another configuration of the ID unit 2 of a second embodiment according to the present invention.

Referring to FIG. 8, the ID unit 2a in the second embodiment of the present invention is substituted for the ID unit 2 in the pipelined computer in FIG. 1.

Referring to FIG. 8, similar to the ID unit 2, the ID unit 2a comprises an instruction register 21; a V flip-flop 22; a privilege exception detector 23; a stage determiner 24; an inverter 25; and an AND gate 26. Unlike the ID unit 2, the ID unit 2a further comprises a privilege instruction detector 27 and an invalidator 28.

The privilege instruction detector 27 decodes the instruction held in the instruction register 21 to detect whether the decoded instruction is the privilege instruction or not. For example, the detector 27 outputs "1" when the privilege instruction is detected. This privilege instruction detector 27 may be constituted integrally with the privilege exception detector 23 as an instruction decoder, like the stage determiner 24. The invalidator 28 is composed of an AND gate which obtains the logical product of the holding instruction from the signal line 205 and the signal line 106. The invalidator 28 outputs the signal indicating unconditionally "no holding" to the signal line 204, that is, "0", when the instruction held in the instruction register 21 is the non-privilege instruction. The invalidator 28 outputs the holding instruction of the signal line 116 to the signal line 204, when the instruction of the instruction register 21 is the privilege instruction.

Next, an operation of the second embodiment will be described with reference to FIGS. 1, 8 and 9.

Figure 9:
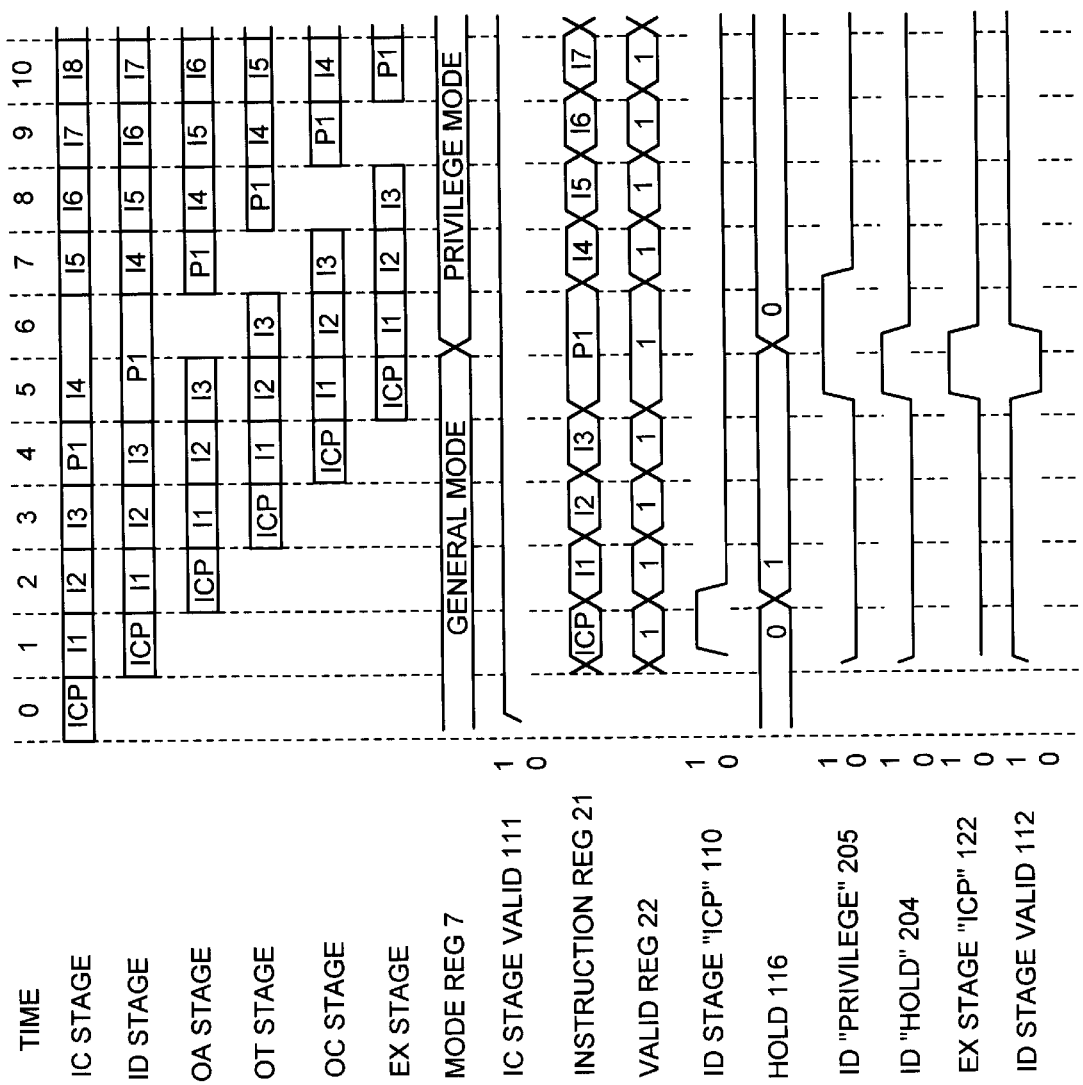
FIG. 9 is a timing chart showing an operation of the second embodiment according to the present invention.

Referring to FIG. 9, the non-privilege instructions I1, I2 and I3 follow the ICP instruction, and the privilege instruction follows these non-privilege instructions I1, I2 and I3. Specifically, the example shown in FIG. 9 deals the case where the privilege instruction P1 appears interposing three instructions between the ICP instruction and the privilege instruction P1.

The ICP instruction read out at time 0 advances to the ID stage, and is set to the instruction register 21. As a result, the instruction decoder 24 outputs "1" to the signal line 110.

At time 2, the ICP instruction advances to the OA stage, and the subsequent non-privilege instruction I1 advances to the ID stage to be set in the instruction register 21. The V flip-flop 22 is set to "1". At the same time, upon receipt of the signal of the signal line 110 at time 2, the flip-flop 8 is set to "1", and the holding instruction of the signal line 116 becomes "1". The operation until this is the same as that of the first embodiment shown in FIG. 5.

Since the instruction of the instruction register 21 is the non-privilege instruction, the instruction decoder 27 outputs "0" to the signal line 205. As a result, the holding instruction of the signal line 204 that is an output from the AND gate 28 becomes "0". Therefore, any of the instruction register 21 and the V flip-flop 22 is never subjected to holding. Moreover, the value "1" of the V flip-flop is output as it is as the V signal 112.

At time 3, the ICP instruction advances to the OT stage, and the subsequent non-privilege instruction I1 advances to the OA stage without being held. The instruction I2 subsequent to the instruction I1 reaches to the ID stage. The instruction I2 is not held because this instruction I2 is the non-privilege instruction.

At time 4, the ICP instruction reaches to the OC stage, and the instructions I1, I2 and I3 advance to the OT, OA and ID stages, respectively. The privilege instruction PI subsequent to these instructions is read out in the IC stage. For a period of time of these operations, the flip-flop 8 instructing the holding in the ID stage continues to hold "1".

At time 5, the ICP instruction advances to the EX stage and the EX unit 6 instructs the signal line 106 to set the privilege mode to the mode register 7 so that the signal line 122 outputs "1". The non-privilege instructions I1, I2 and I3 advance to the OC, OT and OA stages, respectively. The privilege instruction PI advances to the ID stage so that it is set in the instruction register 21. At this time, also the V flip-flop 22 in the ID stage is set to "1" Here, the instruction decoder 27 decides that the instruction PI in the instruction register 21 is the privilege instruction, and outputs "1" to the signal line 205. For this reason, the value of the flip-flop 8 is output by the AND gate 28 to the signal line 204 as it is, and the holding instruction of the signal line 204 becomes "1". Therefore, the instruction register 21 and the V flip-flop 22 is held so that the V signal line 112 in the ID stage becomes "0".

At time 6, the mode register 7 is updated so as to indicate the privilege mode, and the execution of the ICP instruction is completed. The flip-flop 8 is reset to "0" by the signal line 122. The non-privilege instructions I1, I2 and I3 advance to the EX, OC and OT stages, respectively, and the privilege instruction PI remains in the ID stage.

Here, the privilege exception detector 23 decodes the privilege instruction PI according to the privilege mode given through the signal line 107. Since the flip-flop 8 is reset to "0", the holding instruction of the signal line 116 becomes "0". Since the instruction in the instruction register 21 is the privilege instruction PI, the holding instruction of the signal line 204 becomes "0" by the AND gate 28, in spite that the value of the signal line 205 is "1". Therefore, the holdings of the instruction register 21 and the V flip-flop 22 are released, and the V signal of the signal line 112 in the ID stage becomes "1", too.

At time 7, the privilege instruction PI which has been in the ID stage advances to the OA stage. Thereafter, the subsequent instructions are processed sequentially. In this case, the pipeline hazard produced by the ICP instruction is one machine cycle. This implies that two machine cycles are required to execute the ICP instruction. Therefore, in the example of FIG. 9 dealing with the case where the privilege instruction P1 appears interposing three instructions between the ICP instruction and the privilege instruction P1, the processing time equal to the five machine cycles is reduced compared to the case of FIG. 10 where the six machine cycles are required for the processing, to which the present invention is not applied.

In the example of FIG. 9, the case where the privilege instruction P1 appears interposing three instructions between the ICP instruction and the privilege instruction P1 is dealt with. In the case where the privilege instruction P1 appears interposing four instructions between the ICP instruction and the privilege instruction P1 thereafter, the pipeline hazard never occurs, whereby the ICP instruction is processed at one machine cycle. Specifically, the processing time equivalent to as many as six machine cycles is reduced compared to the conventional example shown in FIG. 10.

In this second embodiment, the operations of the ICP and ICG instructions are explained. In order to make improvements for the ACS, ACL and ACD instructions, an instruction which instructs no operand address computation should be detected. In the OA and OT stages, the invalidity of the holding instruction should be performed.

According to the present invention, since it is possible to decide which stage of the pipeline the execution result for the mode changing instruction has an affect on, after the instructions subsequent to the mode changing instruction can previously advance to the stage that is not affected by the execution result for the mode changing instruction, it is possible to wait the settlement of the mode to be changed, whereby the execution time for the mode changing instruction can be shortened.

Moreover, according to the present invention, since it is possible to decide the subsequent instructions which are affected by the mode changing instruction, only the instructions which are affected by the mode to be changed are forced to wait at the stage affected by that mode, among the instructions subsequent to the mode changing instruction, and the processing for the instructions which are not affected by the mode changing instruction are processed unconditionally, the execution time for the mode changing instruction is further shortened.

While the invention has been described in terms of several preferred embodiments, those skilled in the art will recognize that the invention can be practiced with modification within the spirit and scope of the appended claims.

What is claimed is:

1. A pipelined computer having a plurality of stages, each executing a different operation whose operation mode can be changed by a mode changing instruction, comprising:

a stage determiner which determines a stage whose operation is affected by the change of said operation mode, according to a type of said mode changing instruction; and a hold circuit which instructs said stages to hold instructions subsequent to said mode changing instruction in the stage determined by said stage determiner.

2. The pipelined computer according to claim 1, wherein when said mode changing instruction comprises an instruction to change a privilege mode, said stage determined by said stage determiner comprises a stage for detecting a privilege exception.

3. The pipelined computer according to claim 1, wherein when said mode changing instruction comprises an instruction to change an address computation protection mode, said stage determined by said stage determiner comprises a stage for performing an address computation.

4. The pipelined computer according to claim 1, wherein when said mode changing instruction comprises an instruction to change a real address mode and a virtual address mode from each other, said stage determined by said stage determiner comprises a stage for performing an address translation.

5. The pipelined computer according to claim 1, wherein said hold circuit holds only the instructions affected by the operation mode instructed to be changed by said mode changing instruction.

6. The pipelined computer according to claim 1, further comprising:
an instruction detector for detecting an instruction which is affected by an operation mode instructed to be changed by said mode changing instruction,
said hold circuit holding only the instruction detected by said instruction detector.

7. The pipelined computer according to claim 6, wherein when said mode changing instruction comprises an instruction to change a privilege mode, said instruction detected by said instruction detector comprises a privilege instruction.

8. The pipelined computer according to claim 1, wherein instructions subsequent to said mode changing instruction previously proceed to the stage which is not affected by the execution of the mode changing instruction.

9. A method of changing operation modes in a pipelined computer, said pipelined computer having a plurality of stages, each executing a different operation whose operation mode can be changed by a mode changing instruction, comprising:
determining a stage whose operation is affected by the change of said operation mode, according to a type of said mode changing instruction; and
instructing said stages to hold instructions subsequent to said mode changing instruction in the stage determined.

10. The method according to claim 9, wherein when said mode changing instruction comprises an instruction to change a privilege mode, said stage determined comprises a stage for detecting a privilege exception.

11. The method according to claim 9, wherein when said mode changing instruction comprises an instruction to change an address computation protection mode, said stage determined comprises a stage for performing an address computation.

12. The method according to claim 9, wherein when said mode changing instruction comprises an instruction to change a real address mode and a virtual address mode from each other, said stage determined comprises a stage for performing an address translation.

13. The method according to claim 9, wherein said holding holds only the instructions affected by the operation mode instructed to be changed by said mode changing instruction.

14. The method according to claim 9, further comprising:
detecting an instruction which is affected by an operation mode instructed to be changed by said mode changing instruction,
wherein said holding holds only the instruction detected.

15. The method according to claim 14, wherein when said mode changing instruction comprises an instruction to change a privilege mode, said instruction detected comprises a privilege instruction.

16. The method according to claim 9, wherein instructions subsequent to said mode changing instruction previously proceed to the stage which is not affected by the execution of the mode changing instruction.

17. A method of shortening an execution time of an instruction for changing operation modes in a pipelined computer, said pipelined computer having a plurality of stages, each executing a different operation whose operation mode can be changed by a mode changing instruction, said method comprising:
determining a stage whose operation is affected by the change of said operation mode, according to a type of said mode changing instruction; and
instructing said stages to hold instructions subsequent to said mode changing instruction in the stage determined so as to wait for settlement of said operation mode to be changed.

18. The method according to claim 17, wherein instructions subsequent to said mode changing instruction previously proceed to the stage which is not affected by the execution of the mode changing instruction.

19. The method according to claim 17, wherein only instructions which are affected by said mode to be changed wait at a stage affected by said mode to be changed such that processing for instructions which are not affected by said mode changing instruction are processed unconditionally.

* * * * *